United States Patent [19]

Hughes et al.

[11] 4,031,555
[45] June 21, 1977

[54] REEL-TO-REEL TAPE TO TAPE CARTRIDGE ADAPTER

[76] Inventors: Theodore R. Hughes, 28 S. Kingston, Tulsa, Okla. 74112; Glenn L. McCarty, 6319 S. 45 W. Ave., Tulsa, Okla. 74132

[22] Filed: Oct. 20, 1975

[21] Appl. No.: 623,820

[52] U.S. Cl. .................................. 360/94; 360/96
[51] Int. Cl.² .................. G11B 5/78; G11B 15/66; G11B 23/04
[58] Field of Search .................. 360/94, 93, 96, 83, 360/132, 105; 242/55.13, 55.19 A, 197, 200

[56] References Cited

UNITED STATES PATENTS

| | | | |
|---|---|---|---|
| 3,196,214 | 7/1965 | Knoth | 360/93 |
| 3,489,417 | 1/1970 | Harper | 360/94 |
| 3,584,882 | 6/1971 | Krtous | 360/94 |
| 3,644,684 | 2/1972 | Tsuji | 360/94 |
| 3,864,743 | 2/1975 | Staar | 360/94 |
| 3,895,765 | 7/1975 | Korn | 360/94 |
| 3,922,719 | 11/1975 | Negishi et al. | 360/93 |

*Primary Examiner*—Alfred H. Eddleman
*Attorney, Agent, or Firm*—Head, Johnson & Chafin

[57] ABSTRACT

Apparatus for playing conventional reel-to-reel magnetic tapes in a conventional magnetic tape cartridge player and comprising frame means including a portion having a configuration generally complementary to the configuration of the usual magnetic tape cartridge and adapted to be inserted in the usual magnetic tape player in lieu thereof; means provided on the frame means for supporting the usual magnetic tape storage reel and tape take-up reel, and for moving the tape from the storage reel, across the magnetic sound head and capstan of the tape player, and onto the take-up reel whereby the magnetic signals on the reel-to-reel tape may be transduced, amplified and played back through the speaker system of the tape player.

4 Claims, 2 Drawing Figures

REEL-TO-REEL TAPE TO TAPE CARTRIDGE ADAPTER

CROSS-REFERENCE TO RELATES APPLICATION

This application is related to Disclosure Document No. 024114, filed in the U.S. Patent and Trademark Office on or about Oct. 23, 1973, now U.S. Pat. No. 3,692,944.

BACKGROUND OF THE INVENTION

1. Field of the Invention

This invention relates to improvements in magnetic tape player systems and more particularly, but not by way of limitation, to an apparatus for compatibility between a reel-to-reel tape system and a magnetic tape cartridge player system.

2. Description of the Prior Art

During the evolution of the magnetic recording tape industry, there have been many innovations and changes. In the early stages of the magnetic recording tape development, magnetic signals were impressed on the tape, and the tape was stored on a first reel, moved across a magnetic sound head for transducing and amplification, and collected or wound around a take-up reel. Whereas, by and large, the results of this reel-to-reel tape system have been quite satisfactory, during the course of time, different systems were developed which rendered the use and transporting of the tape more facile. For example, tape cartridge have been developed wherein the entire length of the tape is contained within a housing or cartridge. Some of these cartridges encase relatively small reel-to-reel type magnetic tape systems, with the overall size of the cartridge being relatively small for insertion within a compact magnetic tape player. Other types of these cartridges have been developed wherein an endless magnetic tape is stored within a cartridge-type housing which is generally somewhat larger than the reel-to-reel type cartridges, but still considerably smaller and compact than the older real-to-reel type systems.

These last mentioned tape cartridges has come into very extensive use, and the magnetic tape player or magnetic tape deck which is designed particularly to accept these magnetic tape cartridges having the endless tape therein are so designed that the tape in the cartridge is driven by means of a spindle or capstan mounted in the tape player, and which is contacted by a roller in the tape cartridge. The drive means circulates or moves the tape from a reel, across a window or aperture in the leading end of the cartridge, whereby when the cartridge is inserted into the aperture of the tape player, the tape will be in operating contact with a magnetic sound head system, the tape being pressed against the head by suitable means.

As hereinbefore set forth, there has been widespread usage of these cartridge tape players, not only for permanent installation in homes and the like, but also in motor vehicles, or other portable installations. The tapes generally are eight track, adapted to play a number of pairs of tracks. Suitable means is provided in the tape deck or tape player for detecting when the end of the tape, or the splice in the tape, passes a third aperture of the cartridge, and when this happens, suitable movement of the sound head from one pair of tracks to another pair of tracks is automatically achieved.

However, there have been many reels of tape recorded prior to the advent of the cartridge tape playing systems, and which were recorded on the conventional reels and played on machines which provided the two spindles for carrying the storage or supply reel and the take-up reel. Since the reel- to-reel tape system is not compatible with the cartridge system, it has become desirable to provide some adapter means by which the cartridge tape player may be adapted to handle the reel-to-reel tapes in such a manner that the reel-to-reel tapes may be played through the electronics of the cartridge tape player or tape deck.

SUMMARY OF THE INVENTION

The present invention contemplates an apparatus which renders the reel-to-reel tape compatible with the catridge tape player. The apparatus comprises a unitary frame structure including essentially two elements. A first frame portion is of the general size and shap of a conventional magnetic tape cartridge, and is adapted to be inserted into the cartridge tape player. A second frame portion carries a pair of rotatable spindles, one of which supports a supply or storage reel of magnetic tape, and the other of which supports a take-up reel. Roller and belt means are provided on the frame structure for engaging a vertical spindle or capstan normally provided within the tape player, and a drive means is provided for rotating or turning the take-up reel. Guide means is provided for guiding the tape from the supply reel, and onto the take-up reel whereby the tape moves across the first frame portion in a manner substantially identical to the movement of the tape in a conventional tape cartridge. Thus, when the novel apparatus is inserted into the tape player, the magnetic head in the player will contact the tape, and will transduce the signals recorded on the magnetic surface of the tape. The electric signal of the output will then be amplified and applied to appropriate speaker means normally provided in the tape player.

Still more briefly, the invention comprises a mechanical apparatus for rotatably supporting the supply and take-up reels and for guiding the tape from the supply reel into the first frame portion, utilizing the magnetic head means and the electronics of the tape player to transcribe signals from the tape and utilizing the spindle or capstan of the tape player for driving the tape off the supply reel, across the magnetic head, and to the take-up reel, thus rendering a reel- to-reel magnetic tape system compatible with a tape cartridge player system.

DESCRIPTION OF THE PREFERRED EMBODIMENT

Figure 1:
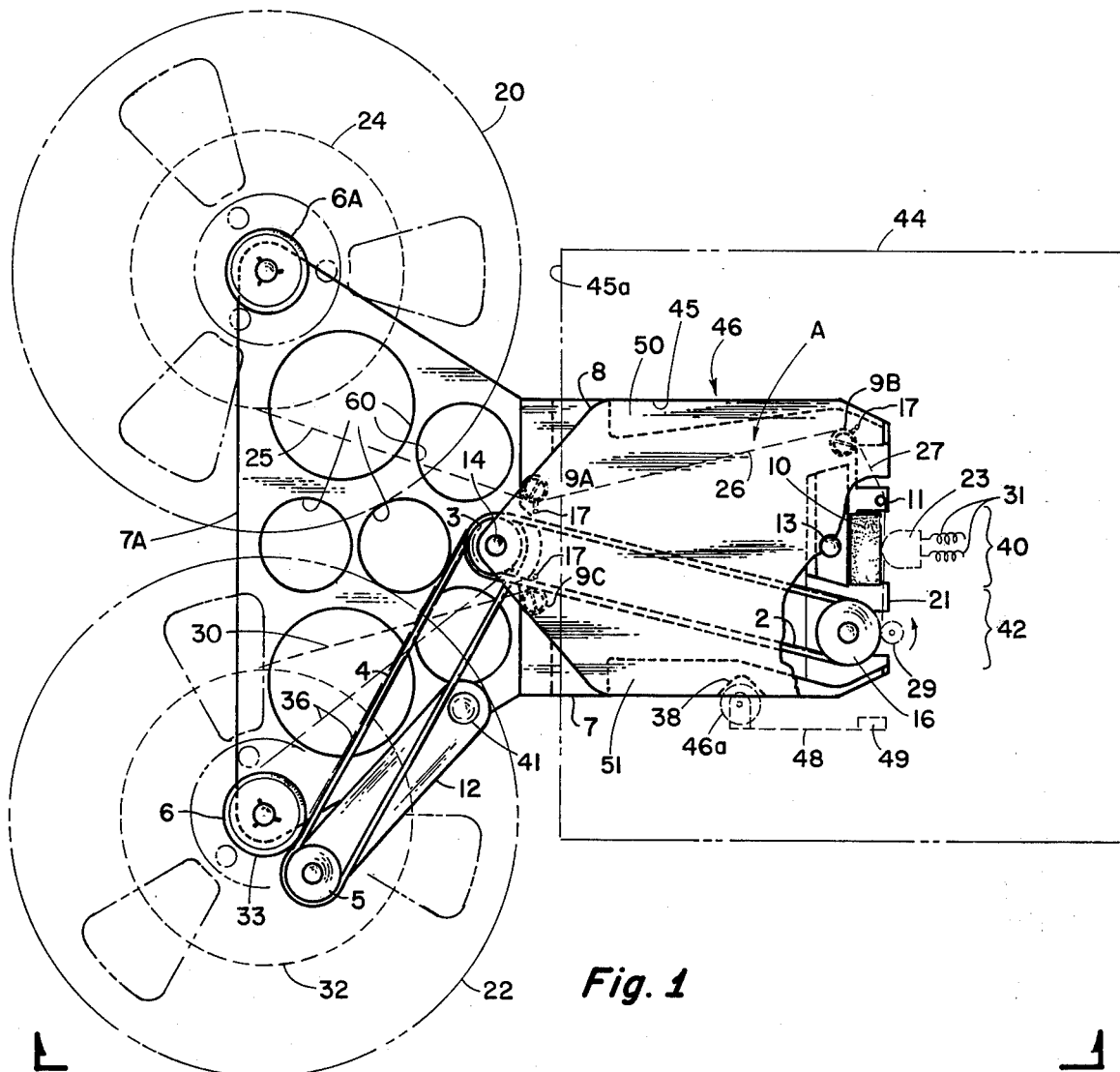
FIG. 1 is a plan view of an apparatus embodying the invention and depicted as installed in a magnetic tape cartridge player or tape deck, taken along the plane of 1—1 of FIG. 2.

Referring to the drawings in detail, the dot and dashed outline 44 represents the general size and shape of a conventional tape cartridge play back unit or player. An aperture 45 is provided in one side 45a of the tape unit 44 for receiving a magnetic tape cartridge (not shwon) therein. The apparatus of the invention is adapted to be inserted within this aperture 45 in lieu of the usual tape cartridge, as will be hereinafter set forth.

Figure 2:
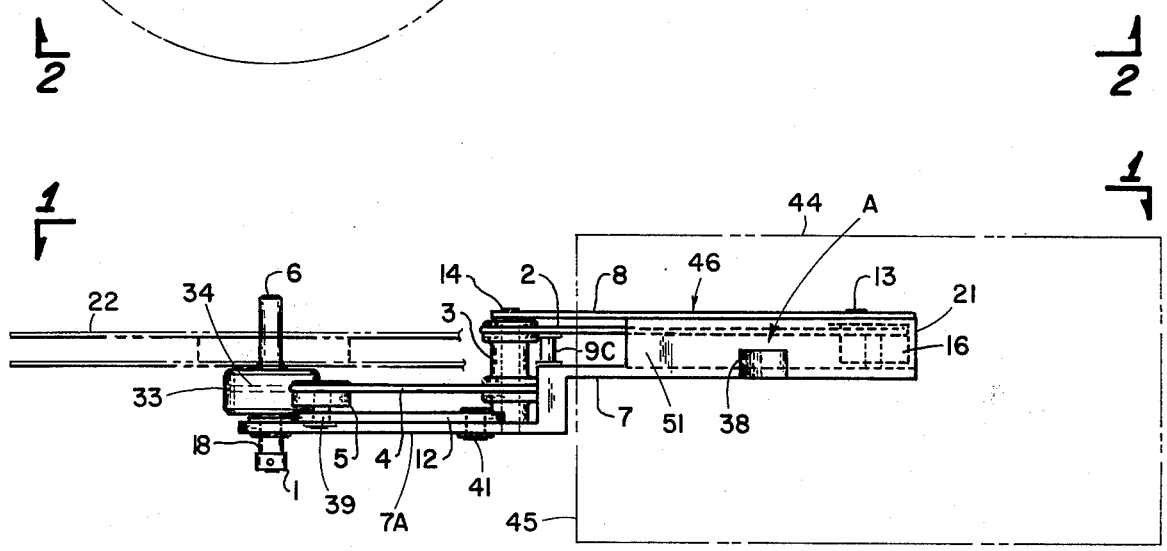
FIG. 2 is a side elevational view taken along line 2—2 of FIG. 1.

The adapter apparatus of the invention, generally indicated at A comprises a first frame portion 46 which is of a rectangular box construction generally similar to the geometric shape of a conventional magnetic tape cartridge (not shown), and as such may be inserted into the aperture 45 of the conventional magnetic tape cartridge player 44. The bottom of the box 46 as viewed in FIG. 2 is a plate 7 having an extension element 7A which provides a support for two reels 20 and 22. The reel 20 may, for example, be a supply reel, carrying a tape 24 to be played, and the reel 22 may be a take-up reel onto which the tape 32 is reeled, as it is played off the supply reel 20 as will be hereinafter set forth.

There are two important elements within the player 44 which are utilized in this invention to provide the power to transport the tape and to transduce the magnetic signals on the tape. These are a vertical spindle 29 shown in dashed lines in FIG. 1, and a magnetic head system 23 shown in dashed lines, said magnetic head system having output terminals 31 which go to amplifiers which are not shown, but are well known in the art. The magnetic head 23 and the spindle or capstan 29 are substantially fixed in position. When a tape cartridge (not shown) is inserted into the player through the aperture 45 in wall 45A, and when the cartridge is locked in position by means of a roller 46a supported on a spring 48 locked into a notch 38, which is part of the outer contour of the tape cartridge end 46 of the apparatus A, the head 23 will then be in contact with a magnetic tape which is positioned on the surface of the back up plate 10. The back up plate 10 is spring supported, and tends to press the tape in contact with the head 23.

A roller, such as the roller 16, is positioned in contact with the capstan 29, and when power is supplied to the motor of the player, the roller 16 will turn and will carry tape along the surface of the back up plate 10 and across the head 23.

In the apparatus A, the tape, instead of being carried on a spool inside of a housing (not shown) as in a conventional cartridge (not shown), is carried on much larger reels 20 and 22, but is guided through the box portion 46 by means of guides and rollers 9A, 9B and pin 11, over the back up plate 10, over the roller 16, over the roller 9C, and so on. Consequently, the tape shown in dashed lines as 24 on the reel 20 will follow the dashed path 25, 26, 27, and 30 to the reel 22 and to the roll 32.

The first frame portion or box 46 comprises a bottom plate 7 which carries an extension 7A which supports the reels 20 and 22, as hereinbefore set forth. A top plate 8 is fastened to suitable sidewalls 50 and 51 in any suitable manner, such as screws, or the like, as is well known in the art. The top plate 8 is indexed by a pin 13 and supports the shaft 14 which carries a pulley 3.

There are two principle apertures in the wall 21 of the box portion 46, said wall 21 forming the leading end of the box 46. These apertures are indicated generally by brackets 40 and 42. The aperture 40 is an opening which exposes the magnetic surface of the tape as it passes over the surface of the back up plate 10, and the other aperture 42 provides a means for permitting the capstan 29 to move within the outer contour of the frame 46 and into engagement with the roller 16. In this respect, the two apertures are identical to those which are normally present on conventional tape cartridges. There is an intermediate second roller 3 which has a groove for guiding a belt 2 which runs from the first roller 16 to the second roller 3. A second groove is provided on the roller 3 which carries a second belt 4 which also runs over a third roller 5. The third roller 5 is rotatably mounted on a pin or shaft 39 which is secured to a rotatable arm 12 which is supported rotatably about a pin 41. The secnd belt 4, which runs over roller 5, causes the arm rotating about the pine 41 to move in a clockwise direction because of the belt tension, and to contact a roller 33 which is mounted on a spindle 18 fastened to the plate 7A. The roller 33 carries a spindle 6 on which the reel 22 is mounted.

In operation, when the apparatus A is inserted into the aperture 45 of the player 44, with the first frame portion 46 being positioned as shown in FIG. 1, the drive roller 16 will be in contact with the vertical spindle or capstan 29 and will drive a belt which will rotate the roller 3, which in turn will drive the belt 4, which will drive the roller 5, and in contact with the roller 33 will drive the spindle 6.

It will be apparent that by eliminating the arm 12 and the roller 5 that the belt 4 around the roller 3 can be twisted 180° in the form of the dashed line 36 and placed around the roller 33 in a groove indicated by dashed lines 34. In this way the drive can be maintained with a simpler mechanical system.

The upper 6A can be of a design similar to the lower spindle 6, which is adapted to rotate on a post or fixed spindle 18 attached to the plate 7A as is well known in the art. There may be a plurality of openings 60 cut into the plate 7A in order to remove metal and make the apparatus A substantially lighter in weight, although this is not an essential part of the apparatus A.

As mentioned briefly, there are a plurality of rollers, such as the rollers 9A, 9B, 9C, and simple guides, such as 17, to guide the tape. By means of the guides and rollers, and means such as pins 11, the tape will be guided past the magnetic head 23 through the aperture 40 in the front face 21 of the frame portion 46.

Suitable means, such as a notch 38, is provided for cooperating with the spring backed roller 46 to lock the device A in proper position with respect to the play back unit 44 during operation of the apparatus A.

Whereas the present invention has been described in particular relation to the drawings attached hereto, it should be understood that other and further modifications, apart from those shown or suggested herein may be made within the spirit and scope of this invention.

What is claimed is:

1. In combination with a conventional magnetic tape player adapted to receive and play a tape cartridge carrying magnetic tape, said cartridge having selected physical and geometric characteristics, said player including:

an aperture for receiving said tape cartridge;

means in said player for driving a transport means for said tape in said tape cartridge;

magnetic head means for contacting and interacting with the magnetized surface of said tape in said cartridge;

amplifier and speaker means for utilizing the electrical signals generated in said magnetic head means;

the improvement in apparatus for adapting said player for playing a non-cartridge type reel-to-reel tape of the type wherein the reels are completely independent elements, comprising:

a. frame means having two principal parts;

1. a first frame means having substantially the same exterior characteristics as said tape cartridge; and adapted to be received in said aperture like said tape cartridge;
2. second frame means for indepently supporting a take up reel and a storage reel, said storage reel carrying a tape to be played in said player, said second frame means adapted to be disposed on the outsideof said player when said first frame means is inserted into said player whereby both of said reels are accessible;

b. means for driving said take up reel, which when said first frame is inserted into said player, is responsive to said means for driving in said player;

c. means in said first frame means for guiding said tape from said storage reel through said first frame means and past a first aperture in the front end of said first frame means similar to the path of the tape and the aperture in said tape cartridge; and then to said take up reel;

whereby when said first frame is inserted into said player, said tape will be in operating relation to said magnetic head means.

2. The apparatus as in claim 1 in which said means for driving comprises:

a. first pulley means positioned in a second aperture in the front end of said first frame means, said first pulley adapted to be driven by said means to drive in said player;

b. second pulley means supported on said second frame;

c. first belt means connecting said first and second pulley means;

d. pivoted arm means on said second frame means;

e. third pulley means on said pivoted arm means;

f. second belt means connecting said second and third pulley means; and g. means to drive said take up reel by said second belt means and said third pulley means.

3. The apparatus as in claim 1, in which said means for driving comprises:

a. first pulley means positioned in a second aperture in the front end of said first frame means, said first pulley adapted to be driven by said means to drive in said player;

b. second pulley means supported on said second frame;

c. first belt means connecting said first and second pulley means;

d. third pulley means on a spindle supporting said take up reel; and e. second belt means connecting said second and third pulley means.

4. The apparatus as in claim 1 in which said means for guiding includes means to press said tape against said head means.

* * * * *

UNITED STATES PATENT OFFICE
CERTIFICATE OF CORRECTION

Patent No. 4,031,555        Dated  June 21, 1977

Inventor(s) Theodore R. Hughes et al.

It is certified that error appears in the above-identified patent and that said Letters Patent are hereby corrected as shown below:

On the cover sheet insert -- Assignee: Glenn L. Mc Carty

Tulsa, Okla. --.

Column 1, lines 8 and 9, ", now U.S. Pat. No. 3,692,944"

should be deleted and period therefor should be inserted.

*Signed and Sealed this*

*Thirty-first* Day of *October 1978*

[SEAL]

Attest:

RUTH C. MASON
*Attesting Officer*

DONALD W. BANNER
*Commissioner of Patents and Trademarks*